United States Patent
Schlack et al.

(10) Patent No.: US 9,191,322 B2
(45) Date of Patent: Nov. 17, 2015

(54) METHODS, APPARATUS AND COMPUTER READABLE MEDIUM FOR MANAGED ADAPTIVE BIT RATE FOR BANDWIDTH RECLAMATION

(75) Inventors: John Schlack, Quakertown, PA (US); Richard Conrad Clemson, Northborough, MA (US); Donald Adrian Dewar, Jr., Derry, NH (US)

(73) Assignee: BEAUMARIS NETWORKS INC., Boxborough, MA (US)

( * ) Notice: Subject to any disclaimer, the term of this patent is extended or adjusted under 35 U.S.C. 154(b) by 226 days.

(21) Appl. No.: 12/781,961

(22) Filed: May 18, 2010

(65) Prior Publication Data
US 2010/0299552 A1    Nov. 25, 2010

Related U.S. Application Data

(60) Provisional application No. 61/179,490, filed on May 19, 2009.

(51) Int. Cl.
*H04L 12/801* (2013.01)
*H04L 12/803* (2013.01)
*H04L 12/825* (2013.01)
(Continued)

(52) U.S. Cl.
CPC .............. *H04L 47/10* (2013.01); *H04L 47/11* (2013.01); *H04L 47/122* (2013.01); *H04L 47/18* (2013.01); *H04L 47/19* (2013.01); *H04L 47/25* (2013.01); *H04L 67/14* (2013.01); *H04L 69/40* (2013.01); *H04N 21/23805* (2013.01);
(Continued)

(58) Field of Classification Search
CPC ......... H04L 67/14; H04L 47/10; H04L 47/25; H04L 47/18

USPC .............. 709/224, 228, 231–232; 714/4.1
See application file for complete search history.

(56) References Cited

U.S. PATENT DOCUMENTS 6,014,694 A * 1/2000 Aharoni et al. ............... 709/219
6,091,777 A * 7/2000 Guetz et al. .............. 375/240.11
(Continued)

FOREIGN PATENT DOCUMENTS

WO    WO 2010109767 A1 * 9/2010 .............. H04L 12/56

OTHER PUBLICATIONS

VMware; Round-Robin Load Balancing; 2007.*
(Continued)

*Primary Examiner* — Jimmy H Tran
(74) *Attorney, Agent, or Firm* — Patent Capital Group

(57) ABSTRACT

A method, apparatus and computer program product for managing content sessions within a network is presented. The systems disclosed herein are able to detect a requirement to modify bandwidth usage within the network either proactively or reactively. In response, example embodiments apply an adaptive bit rate adjustment technique to the content sessions to adjust a data rate associated with each content session according to the requirement to modify bandwidth usage within the network. Example embodiments also then apply a quality of service adjustment technique to the content sessions to adjust a bandwidth allocation assigned between a client and server based upon the adaptive bandwidth adjustment technique. Application of the adaptive bit rate and quality of service adjustment techniques may be policy based. Example embodiments also may monitor a plurality of servers supporting content sessions, detect a failure at a first server and move content sessions to a second server.

23 Claims, 9 Drawing Sheets

(51) Int. Cl.
*H04N 21/238* (2011.01)
*H04N 21/24* (2011.01)
*H04N 21/647* (2011.01)
*H04L 29/08* (2006.01)
*H04L 29/14* (2006.01)

(52) U.S. Cl.
CPC ...... *H04N 21/2402* (2013.01); *H04N 21/2404* (2013.01); *H04N 21/64769* (2013.01)

(56) References Cited

U.S. PATENT DOCUMENTS

| | | | |
|---|---|---|---|
| 6,181,711 B1* | 1/2001 | Zhang et al. | 370/468 |
| 6,857,025 B1* | 2/2005 | Maruyama et al. | 709/235 |
| 7,145,867 B2* | 12/2006 | Aicklen et al. | 370/228 |
| 7,818,444 B2* | 10/2010 | Brueck et al. | 709/231 |
| 8,068,440 B2* | 11/2011 | Stanwood et al. | 370/252 |
| 8,116,337 B2* | 2/2012 | Godlewski et al. | 370/449 |
| 8,565,263 B2* | 10/2013 | Scarborough | 370/468 |
| 8,660,008 B2* | 2/2014 | Babiarz et al. | 370/236 |
| 9,077,655 B2 | 7/2015 | Babiarz et al. | |
| 2004/0133634 A1* | 7/2004 | Luke et al. | 709/203 |
| 2004/0264500 A1* | 12/2004 | Bansal et al. | 370/468 |
| 2005/0076136 A1* | 4/2005 | Cho et al. | 709/231 |
| 2005/0083842 A1* | 4/2005 | Yang et al. | 370/232 |
| 2006/0020694 A1* | 1/2006 | Nag et al. | 709/223 |
| 2006/0268704 A1* | 11/2006 | Ansari et al. | 370/230 |
| 2007/0220302 A1* | 9/2007 | Cline et al. | 714/4 |
| 2008/0028083 A1* | 1/2008 | Rezvani et al. | 709/229 |
| 2008/0109865 A1 | 5/2008 | Su et al. | |
| 2008/0195743 A1* | 8/2008 | Brueck et al. | 709/231 |
| 2008/0275983 A1* | 11/2008 | Ullmann et al. | 709/224 |
| 2009/0172167 A1* | 7/2009 | Drai et al. | 709/226 |
| 2009/0182889 A1* | 7/2009 | Hurst et al. | 709/231 |
| 2012/0224481 A1* | 9/2012 | Babiarz et al. | 370/230.1 |
| 2012/0224483 A1* | 9/2012 | Babiarz et al. | 370/232 |
| 2012/0224484 A1* | 9/2012 | Babiarz et al. | 370/235 |

OTHER PUBLICATIONS

Rejaie et al.; Layered Quality Adaptation for Internet Video Streaming; IEEE Journal on Selected Areas in Communications, vol. 18, No. 12, Dec. 2000.*

Liu et al.; Content-adaptive wireless streaming of instructional videos; Multimed Tools Appl (2006) 28: 157-171 DOI 10.1007/s11042-006-6140-3.*

International Search Report mailed Jul. 12, 2010 in corresponding International Application No. PCT/US2010/35269.

PCT—Nov. 22, 2011 International Preliminary Report on Patentability and Written Opinion from International Application PCT/US10/35269; 6 pages.

EPO Jul. 30, 2013 Extended Search Report and Written Opinion from European Application Serial No. 10778259.

EPO Jul. 24, 2014 Communication from European Application Serial No. 10778259.

PRC Feb. 8, 2014 SIPO First Office Action from Chinese Application Serial No. 2010800032384.5.

PRC Jan. 20, 2015 Third Office Action from Chinese Application Serial No. 2010800032384.5.

PRC Sep. 3, 2014 SIPO Second Office Action from Chinese Application Serial No. 2010800032384.5.

EPO Apr. 1, 2015 Communication regarding European Application Serial No. EP10778259.

* cited by examiner

202 DETECT A REQURIEMENT TO MODIFY BANDWIDTH USAGE WITHIN THE NETWORK

205 PROACTIVELY DETERMINE AN IMPENDING BANDWIDTH CHANGE CONDITION WITHIN THE NETWORK BEFORE OCCURRENCE OF THE BANDWIDTH CHANGE CONDITION WITHIN THE NETWORK

206 MONITOR BANDWIDTH USAGE WITHIN THE NETWORK TO DETERMINE WHETHER BANDWIDTH AVAILABLE WITHIN THE NETWORK CONFORMS TO A POLICY

207 COMPARE BANDWIDTH AVAILABLE WITHIN THE NETWORK TO A CONFIGURABLE VALUE

OR

208 DETECT THE REQUIREMENT TO MODIFY BANDWIDTH USAGE WITHIN THE NETWORK REACTIVELY ACCORDING TO A BANDWIDTH CHANGE CONDITION EXPERIENCE WITHIN THE NETWORK

209 EXAMINE BANDWIDTH USAGE WITHIN THE NETWORK TO DETERMINE A STATE OF BANDWIDTH AVAILABILITY

210 ANALYZE CONTENT SESSIONS WITHIN THE NETWORK TO DETERMINE A DATA RATE OF AT LEAST ONE CONTENT SESSION THAT MAY BE ADJUSTED ACCORDING TO THE BANDWIDTH CHANGE CONDITION EXPERIENCED WITHIN THE NETWORK

FIG. 2B

204 APPLY A QUALITY OF SERVICE ADJUSTMENT TECHNIQUE TO THE CONTENT SESSIONS, THE QUALITY OF SERVICE ADJUSTMENT TECHNIQUE ADJUSTING A BANDWIDTH ALLOCATION ASSIGNED BETWEEN A CLIENT AND SERVER FOR EACH CONTENT SESSION, BASED UPON THE ADAPTIVE BANDWIDTH ADJUSTMENT TECHNIQUE

211 ADJUST BANDWIDTH ALLOCATED TO RESPECTIVE CLIENTS OF THE SESSIONS ACCORDING TO THE ADJUSTED DATA RATE OF DATA ASSOCIATED WITH EACH RESPECTIVE CONTENT SESSION

212 DECREASE BANDWIDTH ALLOCATED TO A CLIENT TO PROVIDE BANDWIDTH FOR ALLOCATION TO A NEW CONTENT SESSION

OR

213 INCREASE BANDWIDTH ALLOCATED TO A CLIENT, THE BANDWIDTH PREVIOUSLY ALLOCATED WITHINT THE NETWORK

FIG. 2C

METHODS, APPARATUS AND COMPUTER READABLE MEDIUM FOR MANAGED ADAPTIVE BIT RATE FOR BANDWIDTH RECLAMATION

CROSS REFERENCE TO RELATED APPLICATIONS

The present application claims the benefit of U.S. Provisional Patent Application No. 61/179,490, filed on May 19, 2009, which is incorporated herein by reference in its entirety.

BACKGROUND

Internet Protocol (IP)-based video delivery is becoming increasingly popular. A client may request IP-based video from a streaming server. The client is the viewing device used by a customer of a service provider to watch video over the IP network and may be a television, computer, mobile device, or other device suitable for watching IP-based video. The client may be connected to the streaming server via the service provider through, for example, a cable modem at a customer's home network.

Typically, there are two conventional systems for delivering IP-based video: "over the top" delivery systems and quality of service (QoS)-based delivery systems. In an "over the top" delivery system, content is provided by a content delivery network (CDN) as IP-based video and transmitted from the CDN over a managed network provided by a network provider. Video delivery in an "over the top" delivery system is best effort; in other words, there is no quality of service guarantee for the video. In QoS-based delivery systems, however, a network provider provides content from its managed network with certain guarantees (e.g., dedicated bandwidth).

In typical "over the top" delivery systems, a client requests video from a streaming server or array of streaming servers in a content delivery network (CDN). The CDN stores video files for the video content. The video may be a video file or it may be a video stream (e.g., broadcast television). In operation, a client requests the video data which is transmitted by the streaming server to the client. The client decodes the video and displays it to the viewer.

However, at times when network bandwidth available for video delivery decreases, possibly due to network congestion, the video delivered to the client may get delayed or lost. This can lead to macro blocking, lost video frames, dropped audio, misaligned audio and video, unintentional pauses, and possibly other undesirable effects on the viewing experience.

SUMMARY

One technique used to handle network congestion is buffering on the client. The client creates a large buffer to store many seconds or minutes of video. The system first fills the buffer before playing. Thus, during short-lived network congestion, there is sufficient content buffered on the client to prevent a loss of video quality. However, if the congestion persists, then the viewing experience will suffer once the client side buffer empties. Additionally, this delays the start of viewing, which may be undesirable.

Another method to handle network congestion is called adaptive streaming. Although there are many different implementation methods, the general idea of adaptive streaming is to encode each video source at different bit rates and switch between the different bit rate sources as the available network bandwidth changes. For example, a video may be encoded at 3 different bit rates: 2.0 Mbps, 1.5 Mbps, and 1.0 Mbps. Further, each encoding may be divided into 2-second segments. Thus, at the end of the play out of one 2-second segment, the next 2-second segment from any encoding may be played such that there is a seamless transition between the 2-second segments which may be at varying bit rates.

At times when the client detects a decrease in the bandwidth of the network connection, most likely due to the delayed delivery of part of the video segment, the client can request the lower bandwidth version for the next 2-second segment. This may be problematic because video quality can degrade significantly. Likewise, at times when the network bandwidth increases, the client detects delivery of the 2-second segment faster than expected. The client can then request the higher bandwidth version for the next video segment. While this technique results in a different video quality shown on the screen, it is an attempt to continue to display video in the face of network congestion.

In typical QoS-based delivery systems, a client requests video from a streaming server or array of streaming servers in the network provider's managed network. This is referred to in the art as a video session. The video may be a video file or it may be a video stream (e.g., broadcast television). In a QoS-based network, bandwidth is dedicated for each video session. The client communicates directly with the streaming server to get the video content, which may be obtained via progressive download or it may be delivered in a stream from the streaming server. The network will have sufficient bandwidth to deliver the video to the client at the selected bit rate because the network bandwidth for the video has been reserved according to the QoS requirements. Therefore the streaming server transmits the video data to the client according to the guaranteed QoS.

Unfortunately, network bandwidth is limited and each video stream has dedicated bandwidth. Thus, although there will be no degradation in video quality for a particular video session as more users are allocated to the network, the dedicated bandwidth requirements limit the number of video sessions that may be supported. The quantity further may be limited when the sessions were set up using high bit rates for the video. Accordingly, new sessions may be denied if there is insufficient bandwidth available in the network to support reserving bandwidth for the new session according to the QoS requirements.

It would be advantageous to provide the benefits of adaptive bit rates to manage the bandwidth of an Internet protocol (IP)-based video delivery system that implements Quality of Service (QoS). It also would be beneficial if a session resource manager (SRM) in an IP-based video delivery system could adjust the bandwidth of existing video sessions in order to accommodate a change in the number of viewers.

Accordingly, example embodiments of the present invention substantially overcome these and other deficiencies and provide a method, apparatus and computer program product for managing content sessions within a network. In operation, example embodiments of the present invention maintain content sessions over the network and detect a requirement to modify bandwidth usage within the network. For example, detecting the requirement to modify bandwidth usage within the network may include proactively determining an impending bandwidth change condition within the network before occurrence of the bandwidth change condition within the network. In other example embodiments, detecting the requirement to modify bandwidth usage within the network may include detecting the requirement to modify bandwidth usage within the network reactively according to a bandwidth change condition experienced within the network. The bandwidth change condition may be a newly requested content session that requires bandwidth on the network or the termination of an existing content session within the network that frees additional bandwidth within the network that may be allocated to other existing content sessions within the network.

After detecting the requirement to modify bandwidth usage within the network, example embodiments apply an adaptive bandwidth adjustment technique to the content sessions. The adaptive bandwidth adjustment technique adjusts a data rate of data associated with each content session. It should be understood that the adaptive bandwidth adjustment technique may adjust the data rate of a content session according to the requirement to modify bandwidth usage within the network. For example, if the requirement to modify bandwidth usage within the network is a newly requested content session, the adaptive bandwidth adjustment technique may reduce the data rate of content sessions within the network to free bandwidth within the network for allocation to the newly requested content session Likewise, if the requirement to modify bandwidth usage within the network is a termination of an existing content session, the adaptive bandwidth adjustment technique may increase the data rate of content sessions within the network to allocate bandwidth previously allocated to the terminated content session.

In example embodiments that proactively determine the impending bandwidth change condition within the network before occurrence of the bandwidth change condition within the network, applying the adaptive bandwidth adjustment technique to the content sessions may include monitoring bandwidth usage within the network to determine whether bandwidth available within the network conforms to a policy, such as by comparing bandwidth available within the network to a configurable value Likewise, in example embodiments that reactively determine the impending bandwidth change condition within the network, applying the adaptive bandwidth adjustment technique to the content sessions may include examining bandwidth usage within the network to determine a state of bandwidth availability, such as by analyzing content sessions within the network to determine a data rate of at least one content session that may be adjusted according to the bandwidth change condition experienced within the network.

After applying the adaptive bandwidth adjustment technique, example embodiments of the present invention also apply a quality of service adjustment technique to the content sessions that adjusts a bandwidth allocation assigned between a client and server for each content session based upon the adaptive bandwidth adjustment technique. In certain embodiments, bandwidth allocated to respective clients of the sessions is adjusted according to the adjusted data rate of data associated with each respective content session. For example, bandwidth allocated to a client may be decreased to provide bandwidth for allocation to a new content session. Similarly, bandwidth previously allocated within the network may be allocated to a client as increased bandwidth.

In other example embodiments, a plurality of servers supporting content sessions to respective clients within the network may be monitored for failure. After detecting a failure experienced at a first server in the plurality of servers, content sessions supported by the first server that experienced the failure may be moved to a second server in the plurality of servers to maintain content sessions over the network. The content sessions may be moved according to a determined priority of the content sessions to be moved according to a policy.

Other example embodiments include a computerized device (e.g., a session resource manager), configured to process all the method operations disclosed herein as embodiments of the invention. In such embodiments, the computerized device includes a memory system, a processor, communications interface in an interconnection mechanism connecting these components. The memory system is encoded with a process that provides bandwidth reclamation as explained herein that, when performed (e.g., when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other embodiments include a computer readable medium having computer readable code thereon for providing bandwidth reclamation. The computer readable medium includes instructions that, when performed (e.g., when executing) on a processor in a computerized device, cause the computerized device to operate as explained herein to perform all of the method embodiments and operations explained herein as embodiments of the invention. Thus any computer readable medium that is encoded with instructions to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing bandwidth reclamation as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 2A-2C are flow diagrams illustrating example methods for use of adaptive bit rates for bandwidth reclamation.

DETAILED DESCRIPTION

Figure 1:
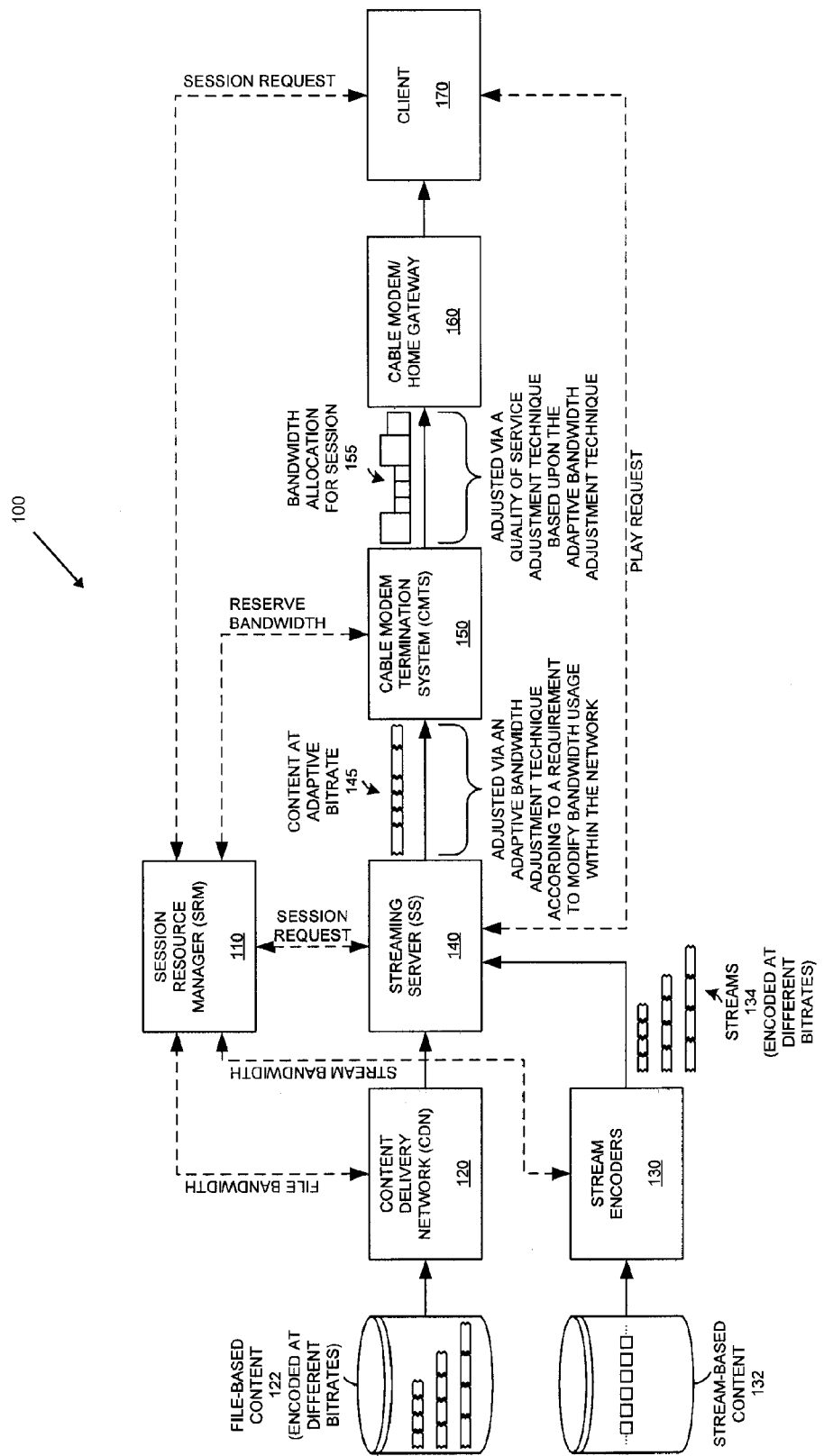
FIG. 1 is a block diagram illustrating an Internet protocol (IP)-based video delivery network according to an example embodiment of the present invention for use of adaptive bit rates for bandwidth reclamation.

FIG. 1 is a block diagram illustrating an Internet protocol (IP)-based video delivery network 100 according to an example embodiment of the present invention for use of adaptive bit rates for bandwidth reclamation. The network 100 includes a Session Resource Manager (SRM) 110 for managing video sessions on the network 100 and performing bandwidth reclamation as will be described below, thereby allowing a Quality of Service (QoS)-based delivery network to support adaptive bit rates. Note that the SRM 110 also may be a session manager, resource manager, policy server, content router or any other network device managing video sessions on the network 100 and performing bandwidth reclamation as described herein.

A Content Delivery Network (CDN) 120, which may be managed by the network 100, stores file-based content (i.e., video files) 122 for video content to be shown during video sessions. As will be described in greater detail below, the CDN 120 may store multiple copies of an item of video content encoded at different bit rates. The network 100 also includes Stream Encoders 130 that create one or more video streams from stream-based content (e.g., broadcast television) 132. The stream encoders 130 may encode each video stream 132 at different bit rates.

A Streaming Server (SS) 140 delivers video (i.e., file-based content 122 or stream-based content 132) as content at an adaptive bit rate 145 toward a Client 170. The Streaming Server 140 gets the video content from the source, either file-based content 122 from the CDN 120 or stream-based content 132 as one of a plurality of streams 134 encoded at different bit rates from the Stream Encoders 130, and delivers it to the Client 170. The Streaming Server 140 may use a progressive download method (e.g., via Hypertext Transfer Protocol (HTTP) GET requests) or a streaming protocol (e.g., Real-time Transport Protocol (RTP)) for delivery, as understood in the art.

In this example embodiment, a Cable Modem Termination System (CMTS) 150 provides high-speed data services to the Client 170, such as IP data, voice, and video. The CMTS 150 communicates directly with a Cable Modem or Home Gateway 160 at the customer premises over a Radio Frequency (RF) network (not shown). Note that use of an RF network and a CMTS 150 in this example network 100 is for illustrative purposes only. It should be understood that the network may be any type of network, such as any IP network, a wireless network, a Digital Subscriber Line (DSL) network, a Fiber to the x (FTTx) network (e.g., a Fiber to the Premises (FTTP) network), a Quadrature amplitude modulation (QAM) network, a Passive Optical Network (PON), or a Digital Subscriber Line Access Multiplexer (DSLAM), and may include one or more routers and switches.

The SRM 110 verifies the network 100 downstream of the CMTS 150 has capacity for new video sessions and directs the setup of the sessions with the Streaming Server 140 and reservations of the bandwidth from the CMTS 150 according to QoS requirements. The SRM 110 may make policy-based decisions during the viewing session. The SRM 110 determines whether the request is for a file-based content (i.e., a video file) 122 or a stream-based content (i.e., a video stream) 132. If the video item is a video file 122, the SRM 110 communicates with the CDN 120 to determine the encoded bit rates of that video file 122. If the video item is a video stream 132, the SRM 110 communicates with the Stream Encoders 130 to determine the bit rates of the video stream 132. Note that the SRM 110 may have other methods for determining the bit rates, such as a configuration file or database lookup.

In operation, the SRM 110 tracks the bandwidth assigned to each video session in a given service region (i.e., network segment). When a viewer (not shown) wants to start a video session, the Client 170 sends a video session setup request to the SRM 110. This request identifies the video item to watch (e.g., a video file 122 or a video stream 132). During session setup, the SRM 110 examines network resource usage between the Streaming Server 140 and the Client 170, and selects a bandwidth of the video session based on the bandwidth remaining on the network for that region (e.g., network segment). If sufficient bandwidth is available without requiring adaptive bandwidth techniques, the SRM 110 may set up the video session using the highest bit rate source with maximum QoS. However, if there is insufficient bandwidth, the SRM 110 examines the existing sessions to determine which sessions, if any, may be adjusted to lower bit rate versions of the content to free bandwidth in the network 100 for the new session. This is referred to as bandwidth adaptation. Such adjustment may be selective based on policy, such as tiered levels of service and Service Level Agreements (SLAs), such that a minimum number of existing sessions are impacted by the bit rate adaptation.

The SRM 110 notifies the Streaming Server 140 of the new video session and selected bandwidth. The SRM 110 then communicates with the CMTS 150 to reserve the bandwidth for new session stream 155 and adjust the bandwidth allocations for all streams subject to bandwidth adaptation to free the bandwidth for the new session stream. This guarantees that the selected bandwidth will not change during the viewing session. The SRM 110 also returns a session setup response to the Client 170. These results specify the maximum bandwidth of the stream and a uniform resource locator (URL) to the Streaming Server 140 to allow the Client 170 to initiate delivery of the video content 122, 132. The Client 170 communicates directly with the Streaming Server 140 using, for example, the URL to get the video content. The content may be obtained via progressive download (e.g., for file-based content 122) or it may be delivered in a stream (e.g., for stream-based content 132) from the Streaming Server 140. Note that, as understood in the art, the stream-based content also may be delivered by progressive download in which the stream is ingested and segmented for request by the Client via progressive download.

In an alternate scenario, the SRM can also increase video session bandwidths when transitioning from high viewership to lower viewership scenarios. The increased bandwidth may increase customer satisfaction with the system.

Note that, as illustrated in FIG. 1, control messages transmitted between the Client 170 device and the SRM 110 and Streaming Server 140 actually pass through the cable modem 160 and CMTS 150. However, for simplicity, control messages are shown going directly between the logical components (i.e., SRM 110, Streaming Server 140, CMRS 150 and cable modem 160).

Operation of the SRM 110 will now be discussed in greater detail with reference to the flow diagrams of FIGS. 2A-2C.

Figure 2A:
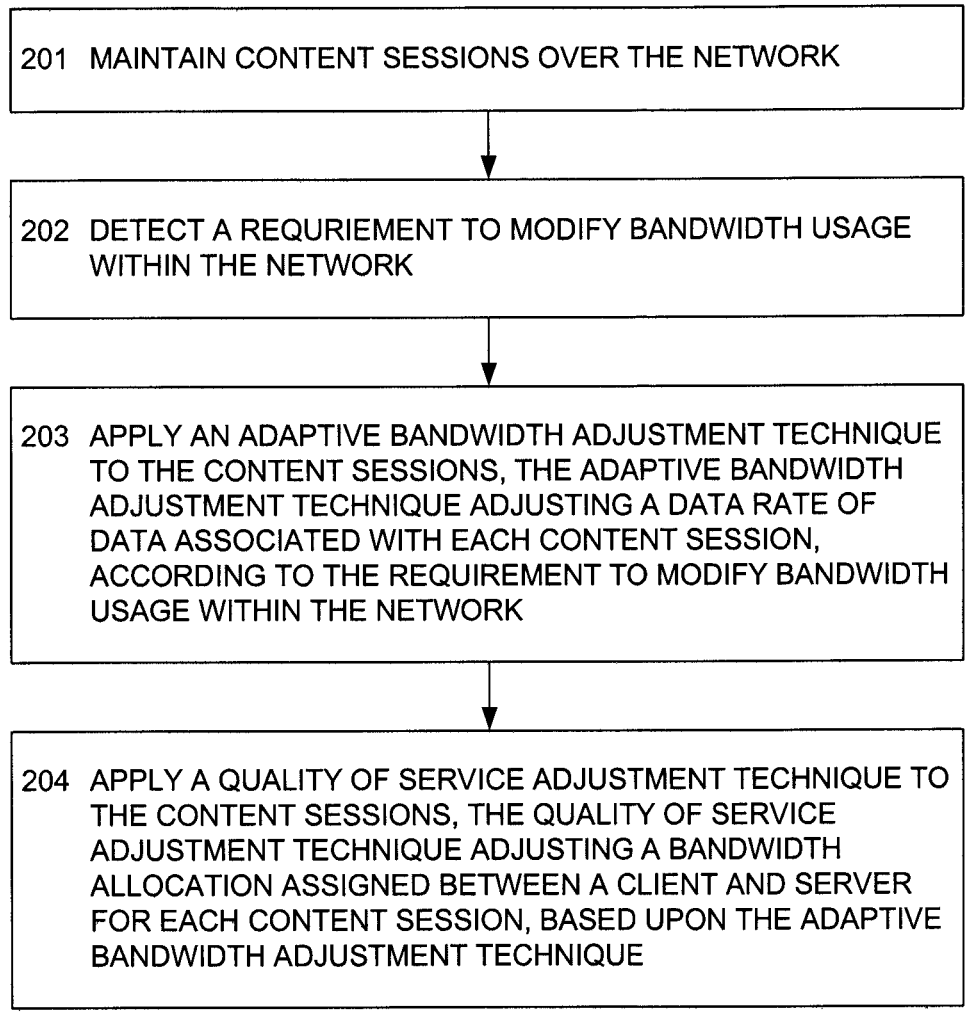

FIGS. 2A-2C are flow diagrams illustrating example methods for use of adaptive bit rates for bandwidth reclamation. As illustrated in FIG. 2A, the SRM 110 maintains content sessions over the network 100 (201), including, for example, monitoring the bandwidth usage of each service region. As available bandwidth drops below critical levels, the SRM 110 detects a requirement to modify bandwidth usage within the network 100 (202), such as that the number of additional video sessions that can be supported in the network 100 is too low because there is inadequate bandwidth available, that excessive bandwidth is available in the network 100 that could be allocated to existing video sessions, or that a new video session has been requested and there is insufficient bandwidth available in the network 100.

The SRM 110 then applies an adaptive bandwidth adjustment technique to the content sessions (203). For example, the adaptive bandwidth adjustment technique may adjust a data rate of data associated with each content session according to the requirement to modify bandwidth usage within the network. The SRM 110 may direct some or all of the existing video sessions to use a lower bit rate in order to reclaim bandwidth for subsequent video sessions. It should also be understood that the SRM 110 also may direct some or all of the existing video sessions to use a higher bit rate if the SRM 110 determines that available bandwidth in the network 100 is excessive.

Note that, as illustrated in FIG. 2B, the process of detecting the requirement to modify bandwidth usage within the network 100 may be proactive (205) or reactive (208). For example, the SRM 110 may proactively determine an impending bandwidth change condition within the network 100 before occurrence of the bandwidth change condition in the network 100 (205). In other words, the SRM 110 may determine that, for performance purposes, it would be beneficial to change the bit rates of the existing video sessions before bandwidth available in the network 100 is exhausted. The SRM may monitor bandwidth usage within the network 100 to determine whether bandwidth available within the network 100 conforms to a policy (206), such as by comparing bandwidth available within the network 100 to a configurable value (207). Although this provides performance benefits, it unnecessarily reduces video quality for the adjusted video session before it really needs to be reduced. Additionally, because the bandwidth change condition has not yet occurred within the network 100, the SRM 110 does not know exactly how much bandwidth will be needed and, based on its estimate, may reclaim too much, further reducing the video quality of existing video sessions, or too little, thereby failing to provide any performance benefit.

Alternatively, the SRM 110 may detect the requirement to modify bandwidth usage within the network 100 reactively according to a bandwidth change condition experienced within the network 100 (208). In other words, the SRM 110 may wait until it receives a session setup request for which insufficient bandwidth exists within the network 100 before it attempts to reclaim bandwidth from other video sessions. The SRM 110 may examine bandwidth usage within the network 100 to determine a state of bandwidth availability within the network 100 (209). The SRM 110 may then analyze content sessions within the network 100 to determine a data rate of at least one content session that may be adjusted according to the bandwidth change condition experienced within the network 100 (210). Although a benefit to reactive operation is that the exact amount of bandwidth to reclaim 1s known to the SRM 110, the actual start of the newly requested video session will be delayed while the SRM 110 reclaims bandwidth from existing video sessions.

Returning to FIG. 2A, the SRM 110 then may reclaim bandwidth available in the network 100 by applying a quality of service adjustment technique to the content sessions (204). For example, the quality of service adjustment technique may adjust a bandwidth allocation assigned between the Client 170 and the Streaming Server 140 for each content session based upon the adaptive bandwidth adjustment technique. During bandwidth reclamation, the SRM 110 determines the amount of bandwidth to be reclaimed. This amount is either estimated for the proactive case or it is exactly known in the reactive case. The SRM 110 knows the available bit rates of each video item and the current bit rate of each video session. The SRM 110 iterates over the video sessions and determines the maximum amount of bandwidth that can be reclaimed from each video session based on current bit rate, available video bit rates, and the video policy for that session, as will be discussed in greater detail with respect to FIG. 5. The SRM 110 sums these values. If sufficient bandwidth can be reclaimed, the SRM 110 begins reclaiming bandwidth from each affected video session by applying the quality of service adjustment technique.

As illustrated in FIG. 2C, to apply the quality of service adjustment technique, the SRM 110 may adjust bandwidth allocated to respective clients of the sessions according to the adjusted data rate of data associated with each respective content session (211). In certain embodiments in which the bandwidth change condition is a new session on the network 100, the SRM 110 may decrease bandwidth allocated to a Client 170 to provide bandwidth for allocation to the new content session (212). Similarly, in certain embodiments in which the bandwidth change condition is a termination of a session on the network 100, the SRM 110 may increase bandwidth allocated to a Client 170 that previously was allocated within the network (e.g., allocated to the now-terminated session) (213).

The SRM may contain a Policy Server (not shown) or it may communicate with a Policy Server (not shown) to determine when and how to reclaim bandwidth. The Policy Server may use the network topology information, existing session data, network usage information, customer/account information, customer SLAs, and policies or rules defined by the operator or equipment vendor to determine which sessions to adjust and when to adjust them.

Figure 3:
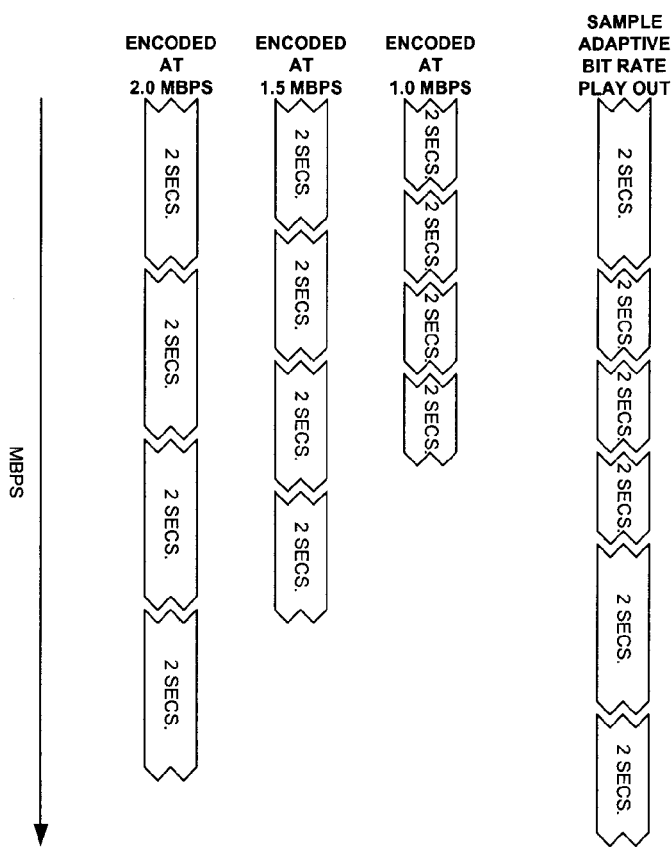
FIG. 3 is a diagram illustrating sample content encoded at several bitrates for selection using an adaptive bit rate technique.

FIG. 3 is a diagram illustrating sample content encoded at several bitrates for selection using an adaptive bit rate technique. As illustrated, the content is encoded in two-second segments at 2.0 Mbps, 1.5 Mbps and 1.0 Mbps, respectively. It then follows that a lesser density of the encoding provides a smaller amount of data to send. The amount of data in each two-second segment may be visualized according to its respective length, although the length may not necessarily be to scale. Also, note that segment times other than two seconds may be used.

Figure 4:
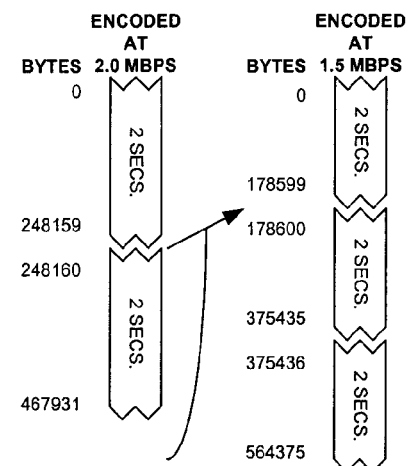
FIG. 4 is a diagram illustrating a table and mapping of video segment numbers and byte offsets to be requested from a client for the content encoded at various bit rates as illustrated in FIG. 3.

FIG. 4 is a diagram illustrating a table and mapping of video segment numbers and byte offsets to be requested from a Client 170 for the content encoded at various bit rates as illustrated in FIG. 3. Each two-second segment has an associated segment number used to request a segment at a particular bit rate. As network congestion fluctuates, the SRM 110 may, for example, determine a bit rate change is needed for a session because insufficient bandwidth is available within the network 100. Accordingly, the SRM 110 may instruct the Streaming Server 140 to change to a lower bit rate source (e.g., file-based content 122 or stream-based content 132).

Such a bit rate change should occur in a manner that minimizes visual disruption for a viewer at the Client 170. Therefore, the Streaming Server 140 changes bit rates at a boundary (i.e., transition) from one segment to another, such as in response an HTTP GET request for a next video segment at an intra (I)-frame of Moving Picture Experts Group part 4 (MPEG-4) compressed video. When the SRM 110 directs the Streaming Server 140 to change source files/streams, the Streaming Server 140 waits for the byte range requested by the Client 170 to reach a video segment boundary. When it does, the Streaming Server 140 switches video source files/streams. However, the Streaming Server 140 must adjust the requested byte range by the difference between the video segment boundaries so that it will continue to return the correct video frame. For example, in switching from the 2.0 Mbps file to the 1.5 Mbps file at the start of video segment 2, when the Streaming Server 140 receives a request for byte 248160 (i.e., corresponding to video segment number 2), it must subtract 69560 from the request (i.e., the difference in start bytes for video segment number 2 between the 2.0 Mbps file and the 1.5 Mbps file) so that the correct video location in the lower bit rate video source is selected.

Therefore, requesting video segment number 1 (i.e., zero seconds offset into the content) will cause byte 0 of any video source (e.g., encoded at 2.0 Mpbs, 1.5 Mbps or 1.0 Mbps) to be returned. Likewise, requesting video segment number 2 (i.e., two seconds offset into the content) will cause byte 248160 of the 2.0 Mbps source file to be returned, byte 178600 of the 1.5 Mbps source file to be returned and byte 118252 of the 1.0 Mbps source file to be returned. Accordingly, because of the respective byte offsets associated with each bit rate, byte 248160 of the 2.0 Mbps source file, byte 178600 of the 1.5 Mbps source file and byte 118252 of the 1.0 Mbps source file correspond to the same time offset in the video content (i.e., two second offset into the content).

Figure 5:
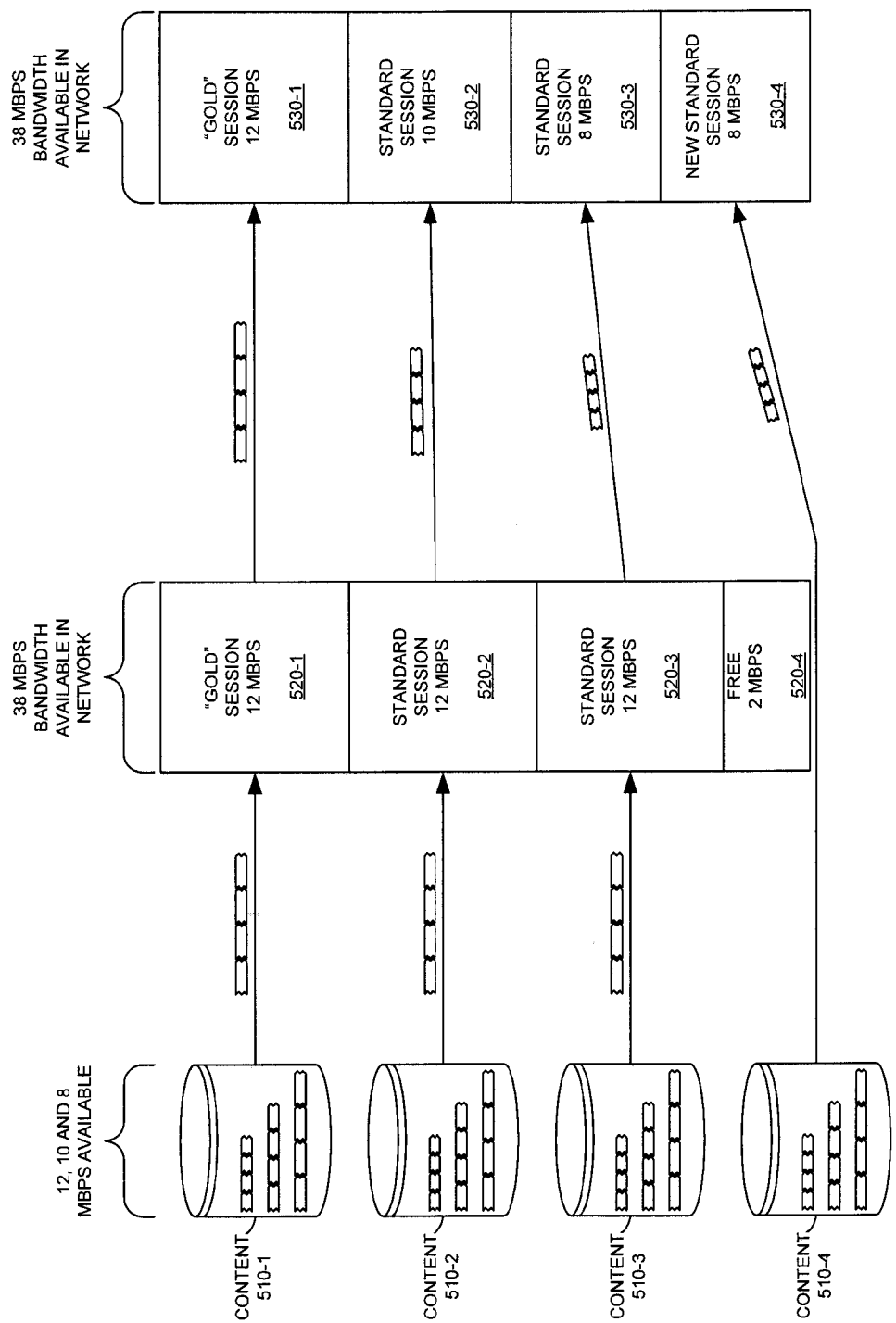
FIG. 5 is a diagram illustrating an example application of bandwidth reclamation.

FIG. 5 is a diagram illustrating an example application of bandwidth reclamation. As illustrated, an SRM (not shown) maintains three sessions 520-1-520-3 over the network (not shown). A viewer with a "gold" package (i.e., SLA) session 520-1 is viewing a high definition (HD) stream at 12 Mbps. As defined in the SLA, for example, viewers with the "gold" package are not subject to bit rate modifications. However, the two standard sessions 520-2, 520-3, also at 12 Mbps, are watching HD streams that are not subject to the "gold" SLA and, according to the SLA, may be subject to bit rate modifications. Each of the streams 510-1-510-3 is available at 12 Mbps, 10 Mbps, and 8 Mbps. With the three 12 Mbps streams on the network and a total maximum available bandwidth on the network of 38 Mbps, there is initially 2 Mbps available on the network.

When the SRM detects a requirement to modify bandwidth usage within the network, such as receiving a request for another HD stream 510-4, which is available at 12 Mbps, 10 Mbps, and 8 Mbps, the SRM determines that there is insufficient bandwidth (i.e., there is only 2 Mbps available). However, by applying an adaptive bandwidth adjustment technique to the content sessions 520-1-520-3, the SRM may reclaim additional bandwidth within the network by adjusting the data rate of data associated with each content session 520-1-520-3 according to the requirement to modify bandwidth usage within the network. Here, because the request for another HD stream 510-4 requires additional bandwidth within the network, the data rates of each content session 520-1-520-3 should be adjusted down.

Accordingly, the SRM may apply an adaptive bandwidth adjustment technique to the content sessions 520-1-520-3 to adjust down data rates of data associated with each content session 520-1-520-3. For example, the SRM may choose the 8 Mbps stream 510-4 for the new session 530-4 to minimize the effect of adjusting down data rates of the existing sessions 520-1-520-3. Accordingly, with 2 Mbps already available within the network, the existing sessions 520-1-520-3, as a whole, must be adjust down in data rate by 6 Mbps. However, the "gold" session as 12 Mbps 520-1 is subject to a SLA that excludes it from such adjustments. Accordingly, the SRM may adjust the data rates of the remaining standard sessions 520-2, 520-3 at 12 Mbps to 10 Mbps 530-2 and 8 Mbps 530-3, as may be determined by a policy within the network. With an additional 6 Mbps (8 Mbps total) now available within the network, the new standard session 530-4 may be supported on the network with a stream having a data rate of 8 Mbps.

The SRM may then apply a Quality of Service adjustment technique to the content sessions 530-1-530-4 adjusting bandwidth allocations for each session assigned between each respective client and the Streaming Server based upon the adaptive bandwidth adjustment technique. For example, with a bandwidth of 8 Mbps assigned by the SRM to the new standard session 530-4, the SRM may allocate the 2 Mbps already available within the network and the 6 Mbps more reclaimed from other sessions on the network. With the data rates of the standard sessions 520-2, 520-3 adjusted down according to the adaptive bandwidth adjustment technique applied by the SRM, the SRM may then apply a QoS adjustment technique to the standard sessions 520-2, 520-3 to reclaim the bandwidth now unnecessarily allocated to each session. For example, the SRM may adjust one session from 12 Mbps 520-3 to 8 Mbps 530-3 and another session from 12 Mbps 520-2 to 10 Mbps 530-2. The "gold" session is not adjusted because of the terms of the SLA. Therefore, based on the adaptive bandwidth adjustment technique and the quality of service adjustment technique, all four HD sessions 530-1-530-4 may be supported simultaneously on the network having a maximum available bandwidth of 38 Mbps.

It should be understood that in other example embodiments, the requirement to modify bandwidth usage within the network may be caused by termination of a session, thereby freeing additional bandwidth for allocation to existing sessions.

Figure 6:
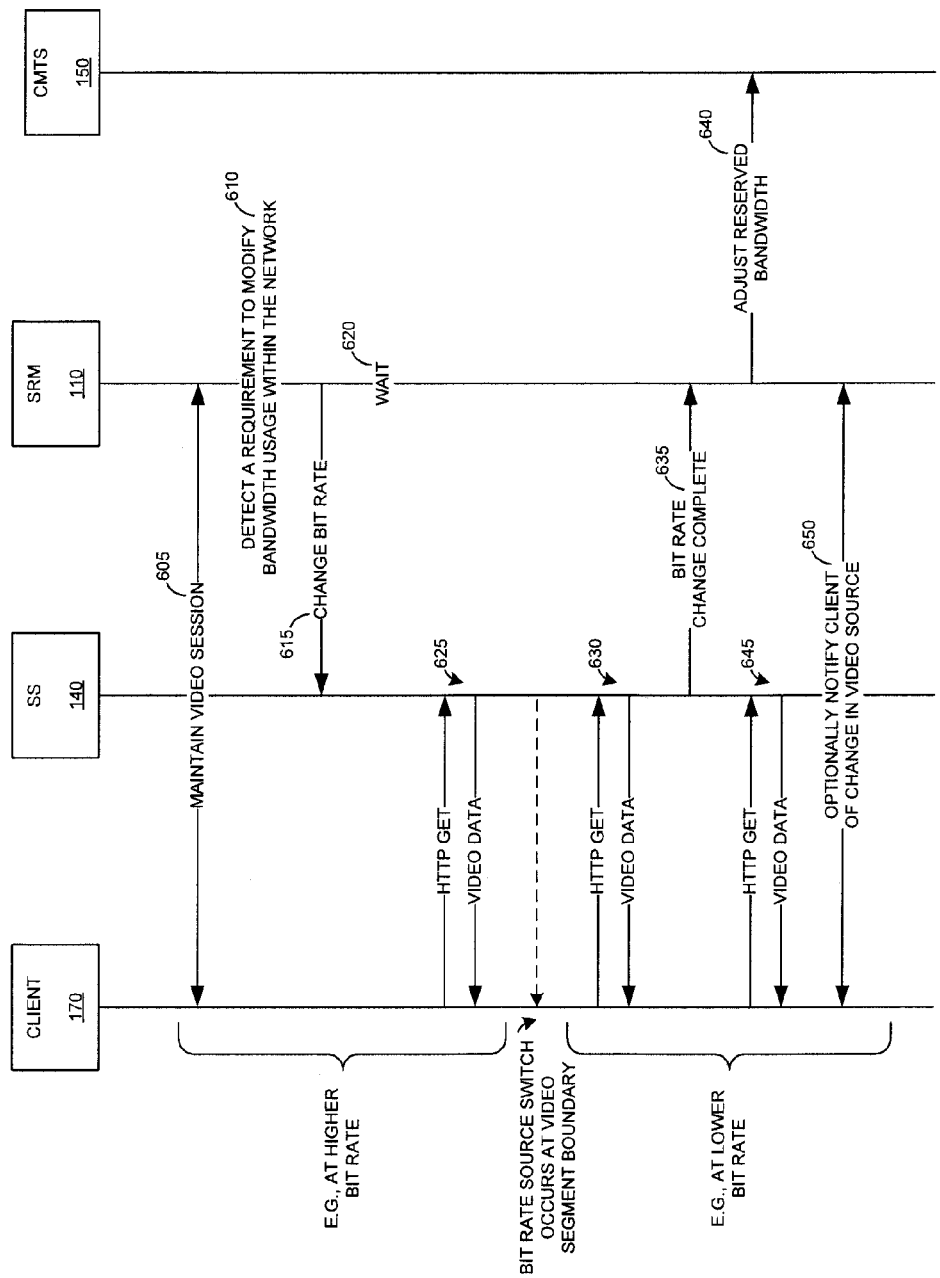
FIG. 6 illustrates an example message flow used by a session resource manager to proactively reclaim bandwidth in a low bandwidth situation.

FIG. 6 illustrates an example message flow used by the SRM 110 to proactively reclaim bandwidth in a low bandwidth situation. In this example, the message flow uses progressive download (i.e., the Client uses HTTP GET requests to get the video). The SRM 110 maintains video sessions on the network (605) and subsequently detects a requirement to modify bandwidth usage within the network (610). In response, the SRM 110 performs the following tasks for each session requiring bandwidth adjustment. First, the SRM 110 applies an adaptive bandwidth adjustment technique to the content sessions by sending a command to the Streaming Server 140 to use the lower bit rate source (whether file or stream) (615). The SRM 110 then waits for acknowledgment of successful transition to the lower bit rate source from the Streaming Server 140 (620).

Note that the Streaming Server 140 may not be able to immediately transition to the lower bit rate source because the stream may only be changed at the end of a two-second segment. In order to support seamless transitions, it is preferable that the switch to the lower bit rate source occur on a well-defined video boundary, such as the start of an I-frame. Additionally, it is further preferred that there be a direct correlation of the well-defined boundaries between each of the different encodings of the video source, thereby allowing seamless transition from one encoded source to another. It may take several HTTP GET requests/video data responses (625) before the Streaming Server 140 can move to the next video segment (630), which is the opportunity to seamlessly switch to the lower bit rate video source.

The Streaming Server 140 then confirms that the transition to the alternate bit rate source is complete (635) because it is now serving the lower bit rate version as requested. In response, the SRM then applies a quality of service adjustment technique to the content sessions by notifying the CMTS 150 of the change in the reserved bandwidth for the video sessions and sending a command to adjust the reserved bandwidth for each session (640). Thus, the CMTS no longer reserves a higher amount of bandwidth to support the higher bit rate stream and frees that bandwidth difference for other use in the network. Otherwise, such overhead bandwidth would be wasted. The Streaming Server 140 and Client 170 may then continue using the lower bit rate source (645). This will reclaim bandwidth and allow establishment of the additional session once the task is complete for all affected sessions. The SRM 110 optionally may notify the Client 170 of the change in video source.

Note that Client 170 that support variable bit rate (VBR) encoding will be able to support the reduction of bit rate and do not need to be informed of the bit rate change. For the progressive downloads, when the Client 170 requests segments of the video file for display, the Client 170 will continue to request data from the original higher bit rate file. However, the Client 170 does not know that the SRM 110 directed a switch to the lower bit rate source because the Streaming Server 140 maps the Client request to the lower bit rate source, as requested by the SRM 110.

It may be beneficial to notify the Client 170 of the bit rate change for progressive downloads. Notifying the Client 170 of the reduction in bit rate will direct it to request fewer bytes of data at a time from the Streaming Server 140. This also simplifies the Streaming Server code because the Streaming Server 140 does not need to map data requests to alternate video sources. However, even if the Client 170 continues to request the larger blocks of data, it does not present a problem because the data will simply arrive a little later at the Client 170 due to the reduced bit rate.

In alternative embodiments, the Streaming Server 140 may perform the methods disclosed herein. The Streaming Server 140 typically is not aware of the network configuration. However, the Streaming Server 140 may transmit data to a Client 170 at the highest rate possible. If the Client 170 is not receiving data fast enough, the Streaming Server 140 may reduce the bit rate. Likewise, the Streaming Server 140 may attempt higher bitrates to maximize throughput.

Figure 7:
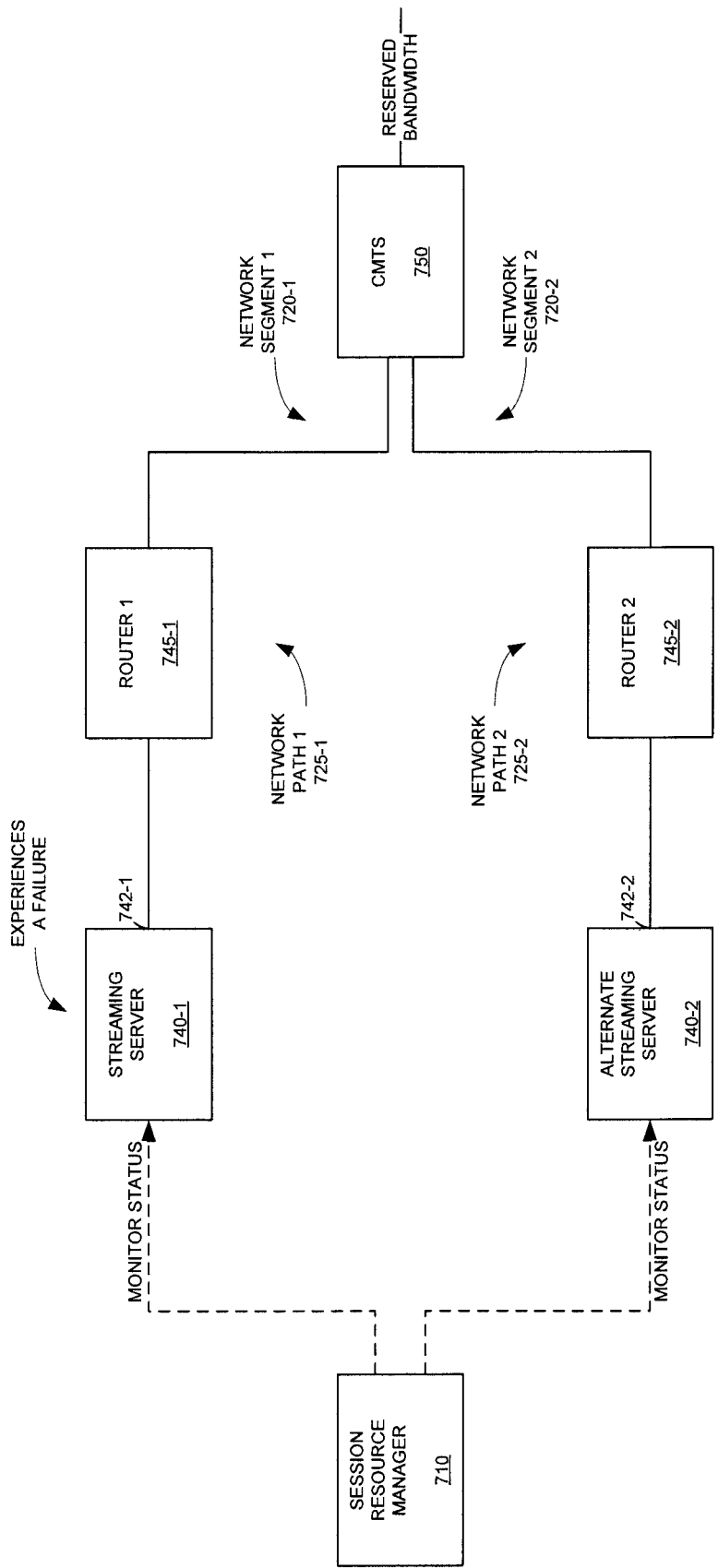
FIG. 7 illustrates a session resource manager monitoring two streaming servers which provides support for failover scenarios experienced in a streaming server.

FIG. 7 illustrates the SRM 710 monitoring two Streaming Servers 740-1, 740-2 which provides support for failover scenarios experienced in a Streaming Server. The SRM 710 is responsible for managing resources of many components, including bandwidth assigned to network segments 720-1, 720-2 and the bandwidth of a stream through the CMTS 750. When setting up a video session, the SRM 710 reserves bandwidth for a network segment 720-1, 720-2 between its respective output port 742-1, 742-2 from the Streaming Server and the CMTS 750. As described above, the SRM 710 also reserves bandwidth in the CMTS 750 for a particular stream to preserve the quality of service. The SRM 710 may be able to detect failures at the Streaming Server 740-1 and move streams served by the failed Streaming Server 740-1 to an alternate Streaming Server 740-2, in order to dynamically recover from the failure.

Each Streaming Server 740-1, 740-2 communicates with the CMTS 750 using respective network paths 725-1, 725-2. The SRM 710 manages bandwidth usage along these different network segments 720-1, 720-2. When a failure is detected, there will likely be many streams served by the failed Streaming Server 740-1 that need to be moved to the alternate Streaming Server 740-2. The SRM 710 tears down any video sessions that cannot be hosted on the alternate Streaming Server 740-2. This may occur if the content is not available on the alternate Streaming Server 740-2 or the alternate Streaming Server 740-2 does not have sufficient capacity to serve additional streams.

The SRM 710 next examines the available bandwidth for each network segment 720-1, 720-2. If there is sufficient bandwidth to simply move all video sessions without selecting a different (e.g., lower bit rate) video source, the SRM 710 directs the Streaming Server to setup the video session and the SRM reserves the network segment bandwidth. Bandwidth in the CMTS does not need to be adjusted since the video source did not change. The video session is using the same bandwidth on the new Streaming Server as was assigned on the failed Streaming Server. However, if there is insufficient bandwidth remaining in the network segment 720-2 in which the alternate Streaming Server 740-2 resides to support moving all streams served by the failed Streaming Server 740-1, even if the SRM 710 adjusts the video sessions to use the minimum bandwidth video sources available, the SRM 710 tears down the lowest priority video sessions. Priority may be assigned by service provider defined criteria or the SRM 710 may consult a Policy Server (not shown) to determine the lowest priority video sessions.

The SRM 710 may need to adjust the bit rate of existing video sessions already served on the alternate Streaming Server 740-2 to accommodate moving the video sessions from the failed Streaming Server 740-1. The SRM 710 directs the alternate Streaming Server 740-2 to switch the video source to a lower bit rate version. Thus, the adaptive bit rate transfer capability can be used to reduce the impact of moving video sessions due to failure. This video source change can be accomplished without consulting the Client (not shown) or it can be coordinated with the Client, as described above. The SRM 710 notifies the CMTS 750 of the reduced bandwidth for that video session.

Finally, if the SRM 710 determines that a different video source is required to reduce the bandwidth used by that video session, the SRM 710 directs the Streaming Server to set up the video session using the lower bit rate video source and the SRM reserves the network segment bandwidth using the lower bit rate. The SRM notifies the CMTS of the reduced bandwidth for the video session.

For the case where the Client uses progressive download to retrieve the video, the host portion of the URL the Client was using to retrieve the video may be invalid due to Streaming Server failure. This can be fixed in a number of different ways without sending a message directly to the Client (which may not be possible due to firewalls). The SRM may update the DNS to direct requests for a particular server to an alternate server. The SRM may direct a proxy server to route the request to the alternate server. The SRM may direct a proxy to return an HTTP Redirect to the Client with the new URL for the content.

The Streaming Server can monitor the downstream bandwidth available to a given client based on the amount of time it takes to transmit data to each Client. If the transmission time of a block of data to the Client indicates a congested network, the Streaming Server can automatically switch the video source to a lower bit rate version. This can be done without consulting the Client or it can be coordinated with the Client, as described above.

Additionally, the Streaming Server may be transmitting data to multiple Clients through the same downstream network path (e.g. downstream video or data QAM). The Streaming Server can monitor the data transmission to this group of Clients collectively. If video delivery is consistently slow for a single Client, the problem is likely the home network of that Client or the Client device itself. In this case, the Streaming Server adjusts the video source for that Client to a lower bit rate.

However, for a group of Clients using the same downstream network path, the Streaming Server may notice delayed transmission sporadically across all of these Clients. In that case, the problem may be network congestion in the service provider's network. It should be possible to calculate the actual network bandwidth and then adjust the video source bandwidth for one or more Clients. Selection of the video session to adjust may be based on policy decisions, as described above.

The Streaming Server may be able to discover common downstream network paths through communication with the SRM, Policy Server, CMTS, routers, etc. It may also use static configuration.

The Streaming Server may be able to transmit video data over multiple IP output ports. For example, the Streaming Server may contain 4 Gigabit Ethernet ports, all of which can be used to transmit data. The Streaming Server may determine that there is a need to move the data transmission for a video session from one output port to another output port. Some possible reasons for moving to a different port include more efficient Streaming Server processing, component failure (e.g. output port failure, card failure, fan failure, etc.), port or processor load, and network path failure (e.g. loss of a router).

The Streaming Server notifies the SRM of the component failure and the need to move the video session to an alternate port. The SRM verifies that the network segment between the new output port and the CMTS has sufficient bandwidth. The SRM reserves the necessary bandwidth on this network segment.

The available bandwidth on the new network segment may be less than the original network segment. In order to compensate, when the SRM directs the SS to move the video session to the alternate port, it also directs the SS to switch the video source to a lower bit rate version. Thus, the adaptive bit rate transfer capability can be used to reduce the impact of moving video sessions due to failure. This video source change can be accomplished without consulting the Client or it can be coordinated with the Client, as described above.

After the SRM receives confirmation that the Streaming Server has moved the video session to the alternate port and the video source has changed, the SRM notifies the CMTS to change the reserved bandwidth for the video session. The SRM releases bandwidth assigned to the original network segment.

Figure 8:
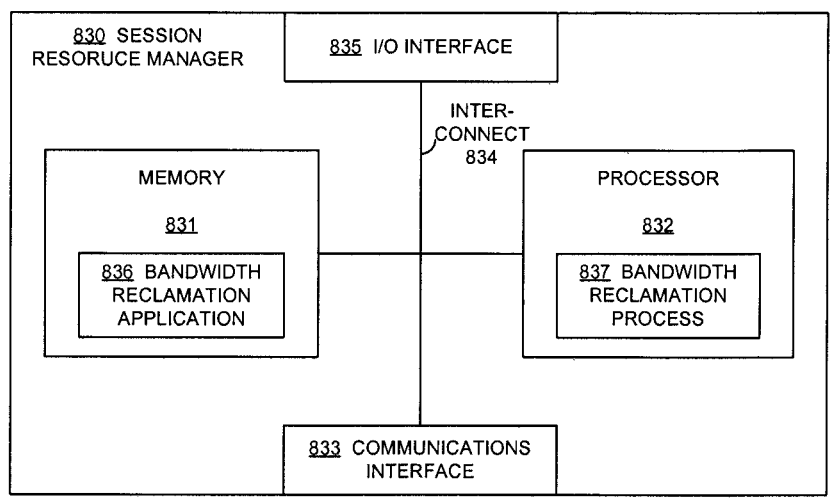
FIG. 8 is a block diagram illustrating an example architecture of a session resource manager that executes, runs, interprets, operates or otherwise performs a bandwidth reclamation application in a bandwidth reclamation process suitable for use in explaining example configurations disclosed herein.

FIG. 8 is a block diagram illustrating an example architecture of a Session Resource Manager (SRM) (e.g., Session Resource Manager 110 of FIG. 1) 810 that executes, runs, interprets, operates or otherwise performs a bandwidth reclamation application 836 in a bandwidth reclamation process 837 suitable for use in explaining example configurations disclosed herein. As shown in this example, the SRM 810 includes a memory 831 encoded with the bandwidth reclamation application 836 and a processor 832 on which the bandwidth reclamation process 837 runs. Further, a communications interface 833 and an input/output (I/O) interface 835 are provided, with an interconnection mechanism 834, such as a data bus or other circuitry, that couples the memory 831, the processor 832, the communications interface 833 and the I/O interface 834. The communications interface 833 enables the SRM 810 to communicate with other devices (e.g., access points and other mobility switches) on a network (not shown).

The memory 831 is any type of computer readable medium and, in this example, is encoded with a bandwidth reclamation application 836 as explained herein. The bandwidth reclamation application 836 may be embodied as software code such as data and/or logic instructions (e.g., code stored in the memory or on another computer readable medium such as a removable disk) that supports processing functionality according to different embodiments described herein. During operation of the SRM 810, the processor 832 accesses the memory 831 via the interconnect 834 in order to launch, run, execute, interpret or otherwise perform the logic instructions of the bandwidth reclamation application 836. Execution of the bandwidth reclamation application 836 in this manner produces processing functionality in the bandwidth reclamation process 837. In other words, the bandwidth reclamation process 837 represents one or more portions or runtime instances of the bandwidth reclamation application 836 (or the entire bandwidth reclamation application 836) performing or executing within or upon the processor 832 in the SRM 810 at runtime.

It is noted that example configurations disclosed herein include the bandwidth reclamation application 836, itself (i.e., in form of un-executed or non-performing logic instructions and/or data). The bandwidth reclamation application 836 may be stored on a computer readable medium (e.g., a floppy disk, hard disk, electronic, magnetic, optical, or other computer readable medium). A bandwidth reclamation application 836 may also be stored in a memory 831 such as in firmware, read only memory (ROM), or, as in this example, as executable code in, for example, Random Access Memory (RAM). In addition to these embodiments, it should also be noted that other embodiments herein include the execution of a bandwidth reclamation application 836 in the processor 832 as the bandwidth reclamation process 837. Those skilled in the art will understand that the SRM 810 may include other processes and/or software and hardware components, such as an operating system not shown in this example.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor," or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method for managing content sessions within a network, the method comprising:
maintaining content sessions over the network;
detecting a requirement to modify bandwidth usage within the network, wherein detecting the requirement to modify bandwidth usage within the network includes proactively determining an impending bandwidth change condition within the network before occurrence of the bandwidth change condition within the network;
applying an adaptive bandwidth adjustment technique to the content sessions before the occurrence of the bandwidth change condition, the adaptive bandwidth adjustment technique adjusting a data rate of data associated with each content session, according to the requirement to modify bandwidth usage within the network, wherein the data rate adjustment for each content session is based upon a current bit rate for the content session, available bit rates for the content session, and a policy associated with the content session, wherein the policy is based upon a service level agreement associated with a service provider customer of each content session, wherein applying the adaptive bandwidth adjustment technique includes sending a first command to a server instructing the server to perform the data rate adjustment; and
applying a quality of service adjustment technique to the content sessions, the quality of service adjustment technique adjusting a bandwidth allocation assigned between a client and the server for each content session, based upon the adaptive bandwidth adjustment technique, wherein applying the quality of service adjustment technique includes sending a second command to a network element between the server and the client device, the second command instructing the network element to perform the adjustment of the bandwidth allocation assigned between the client and the server.

2. The method of claim 1 wherein applying the adaptive bandwidth adjustment technique to the content sessions includes monitoring bandwidth usage within the network to determine whether bandwidth available within the network conforms to the policy.

3. The method of claim 2 wherein monitoring bandwidth usage within the network to determine whether bandwidth available within the network conforms to the policy includes comparing bandwidth available within the network to a configurable value.

4. The method of claim 1 wherein detecting the requirement to modify bandwidth usage within the network further includes detecting the requirement to modify bandwidth usage within the network reactively according to a bandwidth change condition experienced within the network.

5. The method of claim 4 wherein applying the adaptive bandwidth adjustment technique to the content sessions includes examining bandwidth usage within the network to determine a state of bandwidth availability.

6. The method of claim 5 wherein examining bandwidth usage within the network to determine the state of bandwidth availability includes analyzing content sessions within the network to determine a data rate of at least one content session that may be adjusted according to the bandwidth change condition experienced within the network.

7. The method of claim 1 wherein applying a quality of service adjustment technique to the content sessions includes adjusting bandwidth allocated to respective clients of the sessions according to the adjusted data rate of data associated with each respective content session.

8. The method of claim 7 wherein adjusting bandwidth allocated to respective clients of the sessions according to the adjusted data rate of data associated with each respective content session includes decreasing bandwidth allocated to the client to provide bandwidth for allocation to a new content session.

9. The method of claim 7 wherein adjusting bandwidth allocated to respective clients of the sessions according to the adjusted data rate of data associated with each respective content session includes increasing bandwidth allocated to the client, the bandwidth previously allocated within the network.

10. The method of claim 1 further comprising:
monitoring a plurality of servers supporting content sessions to respective clients within the network;
detecting a failure experienced at a first server in the plurality of servers;
moving content sessions supported by the first server that experienced the failure to a second server in the plurality of servers to maintain content sessions over the network.

11. The method of claim 10 wherein moving content sessions supported by the first server that experienced the failure to a second server in the plurality of servers to maintain content sessions over the network includes determining a priority of the content sessions to be moved according to a policy.

12. A computerized device for managing content sessions within a network comprising:
a memory;
a processor;
a communications interface; and
an interconnection mechanism coupling the memory, the processor and the communications interface;
wherein the memory is encoded with a bandwidth reclamation application that when executed in a process on the processor is capable of reclaiming bandwidth in the network by performing the operations of:
maintaining content sessions over the network;
detecting a requirement to modify bandwidth usage within the network, wherein the operation of detecting the requirement to modify bandwidth usage within the network includes the operation of proactively determining an impending bandwidth change condition within the network before occurrence of the bandwidth change condition within the network;
applying an adaptive bandwidth adjustment technique to the content sessions before the occurrence of the bandwidth change condition, the adaptive bandwidth adjustment technique adjusting a data rate of data associated with each content session, according to the requirement to modify bandwidth usage within the network, wherein the data rate adjustment for each content session is based upon a current bit rate for the content session, available bit rates for the content session, and a policy associated with the content session, wherein the policy is based upon a service level agreement associated with a service provider customer of each content session, wherein applying the adaptive bandwidth adjustment technique includes sending a first command to a server to perform the data rate adjustment; and
applying a quality of service adjustment technique to the content sessions, the quality of service adjustment technique adjusting a bandwidth allocation assigned between a client and the server for each content session, based upon the adaptive bandwidth adjustment technique, wherein applying the quality of service adjustment technique includes sending a second command to a network element between the server and the client device, the second command instructing the network element to perform the adjustment of the bandwidth allocation assigned between the client and the server.

13. The computerized device of claim 12 wherein the operation of applying the adaptive bandwidth adjustment technique to the content sessions includes the operation of monitoring bandwidth usage within the network to determine whether bandwidth available within the network conforms to a policy.

14. The computerized device of claim 13 wherein the operation of monitoring bandwidth usage within the network to determine whether bandwidth available within the network conforms to the policy includes the operation of comparing bandwidth available within the network to a configurable value.

15. The computerized device of claim 12 wherein the operation of detecting the requirement to modify bandwidth usage within the network further includes the operation of detecting the requirement to modify bandwidth usage within the network reactively according to a bandwidth change condition experienced within the network.

16. The computerized device of claim 15 wherein the operation of applying the adaptive bandwidth adjustment technique to the content sessions includes the operation of examining bandwidth usage within the network to determine a state of bandwidth availability.

17. The computerized device of claim 16 wherein the operation of examining bandwidth usage within the network to determine the state of bandwidth availability includes the operation of analyzing content sessions within the network to determine a data rate of at least one content session that may be adjusted according to the bandwidth change condition experienced within the network.

18. The computerized device of claim 12 wherein the operation of applying a quality of service adjustment technique to the content sessions includes the operation of adjusting bandwidth allocated to respective clients of the sessions according to the adjusted data rate of data associated with each respective content session.

19. The computerized device of claim 18 wherein the operation of adjusting bandwidth allocated to respective clients of the sessions according to the adjusted data rate of data associated with each respective content session includes the operation of decreasing bandwidth allocated to the client to provide bandwidth for allocation to a new content session.

20. The computerized device of claim 18 wherein the operation of adjusting bandwidth allocated to respective clients of the sessions according to the adjusted data rate of data associated with each respective content session includes the operation of increasing bandwidth allocated to the client, the bandwidth previously allocated within the network.

21. The computerized device of claim 12 further comprising the operations of:
   monitoring a plurality of servers supporting content sessions to respective clients within the network;
   detecting a failure experienced at a first server in the plurality of servers;
   moving content sessions supported by the first server that experienced the failure to a second server in the plurality of servers to maintain content sessions over the network.

22. The computerized device of claim 21 wherein the operation of moving content sessions supported by the first server that experienced the failure to a second server in the plurality of servers to maintain content sessions over the network includes the operation of determining a priority of the content sessions to be moved according to a policy.

23. A non-transitory computer readable storage medium encoded with computer readable code that when executed on a processor in a computerized device provides content session management within a network, the medium comprising:
   instructions for maintaining content sessions over the network;
   instructions for detecting a requirement to modify bandwidth usage within the network, wherein detecting the requirement to modify bandwidth usage within the network includes proactively determining an impending bandwidth change condition within the network before occurrence of the bandwidth change condition within the network;
   instructions for applying an adaptive bandwidth adjustment technique to the content sessions before the occurrence of the bandwidth change condition, the adaptive bandwidth adjustment technique adjusting a data rate of data associated with each content session, according to the requirement to modify bandwidth usage within the network, wherein the data rate adjustment for each content session is based upon a current bit rate for the content session, available bit rates for the content session, and a policy associated with the content session, wherein the policy is based upon a service level agreement associated with a service provider customer of each content session, wherein applying the adaptive bandwidth adjustment technique includes sending a first command to a server to perform the data rate adjustment; and
   instructions for applying a quality of service adjustment technique to the content sessions, the quality of service adjustment technique adjusting a bandwidth allocation assigned between a client and the server for each content session, based upon the adaptive bandwidth adjustment technique, wherein applying the quality of service adjustment technique includes sending a second command to a network element between the server and the client device, the second command instructing the network element to perform the adjustment of the bandwidth allocation assigned between the client and the server.

* * * * *